Figure 1:
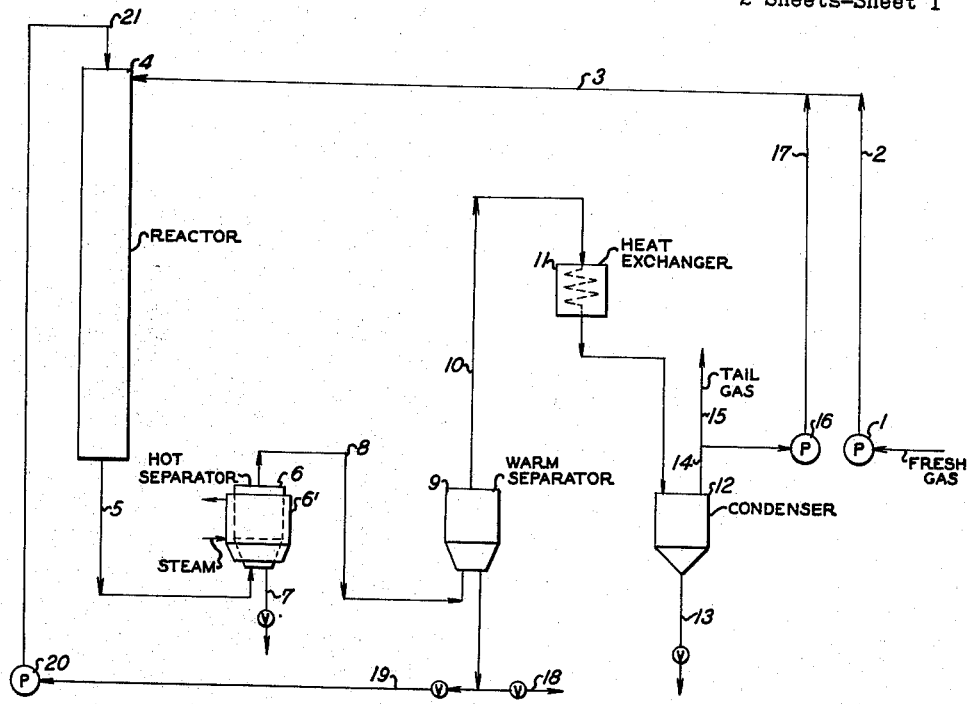

Oct. 25, 1960 W. ROTTIG ET AL 2,957,902
CATALYTIC HYDROGENATION OF CARBON MONOXIDE
Filed Jan. 23, 1956 2 Sheets-Sheet 1

INVENTOR.
WALTER ROTTIG
WALTER WISCHERMANN
BY
ATTORNEYS

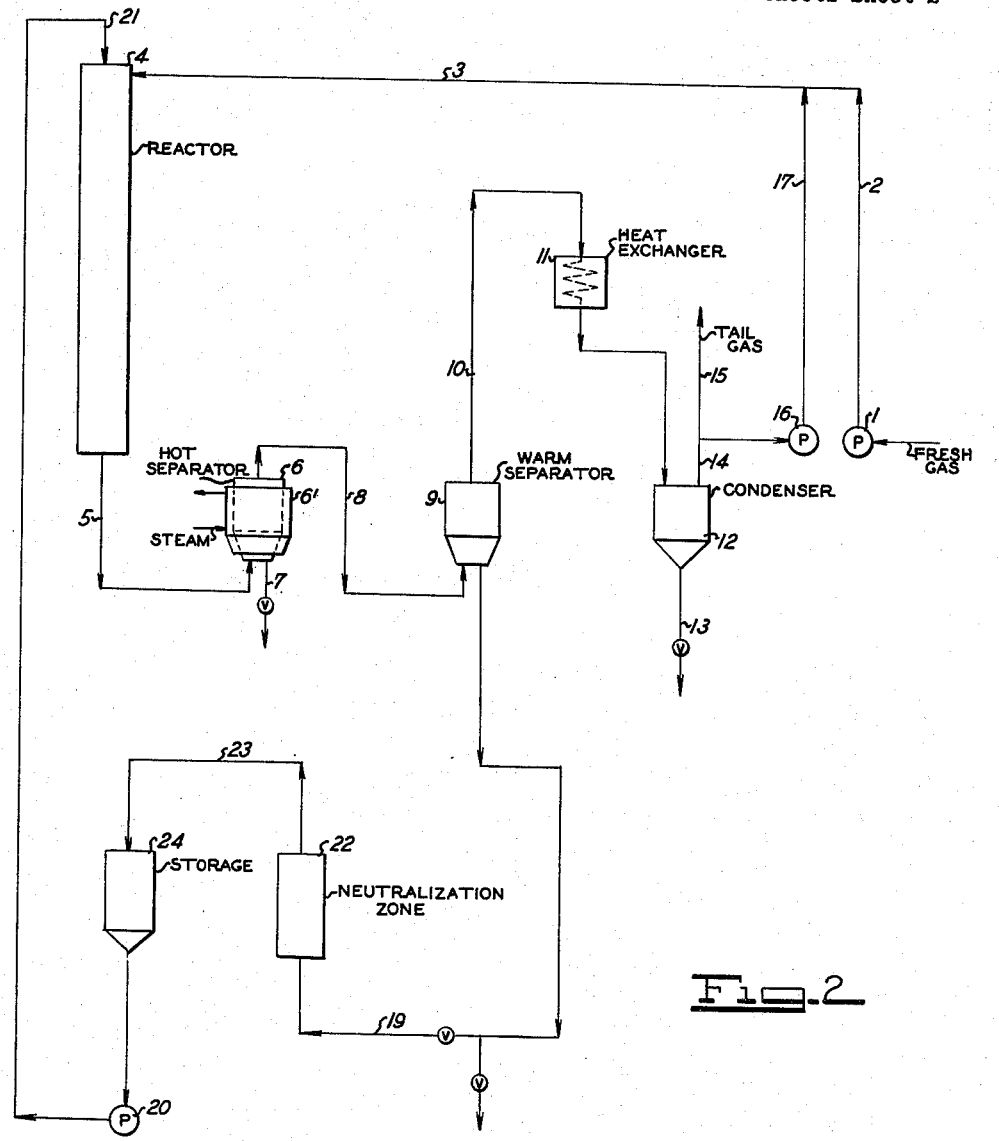

United States Patent Office 2,957,902
Patented Oct. 25, 1960

---

2,957,902
CATALYTIC HYDROGENATION OF CARBON MONOXIDE

Walter Rottig, Oberhausen-Sterkrade-Nord, and Walter Wischermann, Oberhausen-Sterkrade, Germany, assignors to Ruhrchemie Aktiengesellschaft, Oberhausen-Holten, Germany, and Lurgi Ges. f. Warmetechnik m.g.H., Frankfurt am Main, Germany, a corporation of Germany Filed Jan. 23, 1956, Ser. No. 560,773
Claims priority, application Germany Jan. 26, 1955
22 Claims. (Cl. 260—449.6)

This invention relates to new and useful improvements in the catalytic hydrogenation of carbon monoxide.

The catalytic hydrogenation of carbon monoxide with the production of hydrocarbon and, in certain cases, oxygenated hydrocarbon, is well known in the art.

When effecting the catalytic hydrogenation of carbon monoxide with the use of iron, cobalt or nickel synthesis catalysts under normal atmospheric pressure or at slightly elevated pressures up to about 3 atmospheres, with the catalysts in the form of a fixed-bed, arranged, for example, in a tubular or lamellar furnace, it is known to extract the catalysts with solvents such as hydrocarbon after certain intervals of operation. The extraction is mainly required due to the relatively fast decrease in the activity of the catalyst due to the deposition of high boiling hydrocarbons on the catalysts surface. A large number of various methods perfecting the extraction of the catalyst is known in the art. In accordance with one known method, for example, the liquid synthesis products obtained from the synthesis are distributed in a partial stream and used for the extraction of the catalyst. The moist catalyst thus extracted is then freed from the extraction oil by drying and is again used for the synthesis reaction. In accordance with another known method, the extraction is effected for relatively short periods of time followed by an immediate regeneration with hydrogen or steam. In accordance with a still further known method, frequent extractions with diesel oil are effected, particularly during the start-up period whereby the use of particularly low synthesis temperatures can be achieved along with a high $CO+H_2$ conversion.

Further modes for effecting the extraction are mentioned in Kainer's "Die Kohlenwasserstoffsynthese nach Fischer-Tropsch," 1950, pages 93–97. The extraction of catalysts and particularly of cobalt catalysts effected on a large scale is described in F. Martin, E. Weingaertner, "Die Fischer-Tropsch-Synthese." Other embodiments of extraction processes are disclosed in various printed publications and published patents.

It was generally believed in the art, however, that the extraction of the catalyst was only effective and useful in connection with synthesis processes which were operated at atmospheric or relatively low pressures as, for example, below about 8 atmospheres. With synthesis processes which were operated at somewhat higher pressures, as for example above about 8 atmospheres, the decrease in the conversion during the period of operation could not be observed to the extent experienced in processes operated at the lower pressures. It was frequently found that, when attempting an extraction of a catalyst used in a synthesis effected at an elevated pressure, that actually a decrease in the catalyst life and in the synthesis results were obtained than when operating without such an extraction.

One object of this invention is to increase the catalyst life and improve the synthesis results in a catalytic carbon monoxide hydrogenation effected at elevated pressures of above 8 atmospheres by a catalyst extraction process.

This and still further objects will become apparent from the following description read in conjunction with drawings which show flow sheets of embodiments of the method in accordance therewith.

In accordance with the invention, it has been found that in the catalytic hydrogenation of carbon monoxide using cobalt, nickel and preferably iron catalysts at elevated pressures in excess of 8 atmospheres and preferably between about 10 and 60 atmospheres, the catalyst life and the synthesis results can be surprisingly improved if the catalyst mass is subjected to periodic short duration extractions directly effected in the synthesis reactor or furnace without an interruption of the synthesis gas and/or recycled gas flow with relatively large quantities of a liquid extracting agent. The extractions in accordance with the invention, which are in effect "extraction shocks" should each be effected for less than 60 minutes and preferably less than 30 minutes, as for example less than 15 minutes at time intervals of between 4 to 48 and preferably 4 to 24 hours.

Very surprisingly and unexpectedly as a result of these specific extractions the synthesis may be continued at temperatures which are about 30 to 50° C. lower than those required by the same catalysts under the identical synthesis conditions when no extraction is effected. This considerable decrease in the synthesis temperature is of course highly desirably and results in a surprising improvement in the synthesis. In spite of the decrease in the synthesis temperature, the catalyst extracted in accordance with the invention may be used with high gas loads and effect a high conversion in spite of these high gas loads.

While the process in accordance with the invention is applicable in connection with any cobalt, nickel or preferably iron catalyst, the same is advantageously used in connection with sintered or fused catalysts and when the same is used in connection with precipitated catalysts, it is desirable to effect the synthesis for extended periods of times and preferably several months before beginning the first extraction. It is particularly true in connection with highly active precipitated catalysts such as carrier-free precipitated catalysts or precipitated catalysts containing less than 30 parts by weight of a carrier material.

An improvement in accordance with the invention is effective with the catalysts used in any of the known forms including the fluidized bed and the so-called slurry synthesis in which the catalysts is suspended in a liquid. The invention, however, is particularly effective in connection with synthesis operation using a fixed bed catalyst.

The invention is applicable to all carbon monoxide hydrogen operations with the preferred production of hydrocarbons as well as for synthesis processes with the preferred formation of oxygen containing compounds, primary aliphatic amines or mixtures of these three components.

The extraction in accordance with the invention may be effected with any of the known or conventional extraction agents used in the extraction of catalysts of this type. Thus, for example, hydrocarbon such as diesel oil or gasoline fractions may be used for the extraction though it has been found preferable to use liquid products obtained in the synthesis itself and containing not less than 50% of compounds boiling above 180° C. as, for example, between about 180 and 320° C., and preferably between about 200 and 260° C.

When using liquid synthesis products themselves as the extraction liquid, the same is, for example, withdrawn from the so-called intermediate separator which is an air-cooled separator generally arranged downstream from what is known as the hot separator of the synthesis unit. The location of this intermediate separator is, for example, up stream of the heat exchanger and the condensation proper, i.e. up stream of the point where the separation of the liquid synthesis products by water-cooling is effected. Naturally the product withdrawn from this intermediate separator is not exclusively comprised of the usual boiling range of a diesel oil fraction but also contains considerable portions, i.e. about 10 to 20% of compounds boiling above 320° C. and substantial portions of lower boiling compounds boiling below about 180° C. While such a wide boiling range product was not conventionally believed as desirable for use as an extraction agent, in accordance with the invention, it has been found that with this wide boiling range product, the effect of the extraction is even more favorable in many cases than that obtained when using diesel oil boiling between about 180° and 320° C. as was generally used in the art.

The boiling range of the liquid used for the extraction is of considerable importance for the effect in accordance with the invention. Extraction oils consisting preferably of low molecular weight hydrocarbons, as for example gasoline fraction, have not proven too effective while very favorable results have been obtained with the above mentioned liquid synthesis products themselves which contain at least 50 and preferably more than 75% of the fractions boiling between about 180 and 320° C. and preferably between about 200 and 260° C. The presence of oxygen-containing and/or nitrogen-containing compounds in these fractions, even to the extent of more than 10% is not detrimental to the extraction process in accordance with the invention. The extraction oil, however, should not have too high a content of portions boiling above 320° C. since obstructions in the conveying equipment and lines can occur by flocculated soft and hard paraffin, especially at the fluctuating temperatures and cause breakdown. Moreover the extraction efficiency is reduced by the presence of too high a content of these higher boiling portions.

It has been found for example that only a relatively poor extraction efficiency is obtained with an extraction oil which is derived from the cold separator of the synthesis unit and therefore represents a synthesis product which, after extensive separation of the high molecular weight hydrocarbon and hydrocarbon boiling in the diesel oil range, preferably includes products of the gasoline fraction. A product of this kind has, for example, the following composition:

| | Percent |
|---|---|
| Boiling up to 180° C. | 64 |
| 180–320° C. | 30 |
| 320°–460° C. | 5 |

In contrast to this, very good results may be obtained with the use of an extraction oil derived from the intermediate separator of the synthesis unit which has the following boiling range constituents:

| | Percent |
|---|---|
| Up to 180° C. | 18 |
| 180–320° C. | 57 |
| 320–460° C. | 23 |
| Above 460° C. | 2 |

An even more favorable extraction efficiency may be obtained when using as the extraction agent a product derived directly down stream of the intermediate separator. This product has, for example, the following boiling range constituents:

| | Percent |
|---|---|
| Up to 180° C. | 12 |
| 180–320° C. | 80 |
| 320–460° C. | 8 |
| Above 460° C. | -- |

In the hydrogenation of carbon monoxide, the synthesis products which may consist of hydrocarbons mixed, as the case may be, with oxygen-containing compounds are preferably withdrawn in one or several series-connected tanks filled with suitable packings such as Rashig rings and located down stream of the hot-separator which, in the case of normal condensation, is arranged down stream of the synthesis reactor. The gas should be passed through these tanks in upward direction and leave them at the top. By these measures, i.e. the presence of filling bodies in the tanks and the upward direction of the gas, there is obtained a rectification effect the result of which is that, at this point of the condensation equipment, an extraction oil is obtained which has a content of low boiling compounds, i.e. compounds boiling up to about 180° C., of about 20% by weight and preferably less and a content of high boiling compounds, i.e. compounds boiling above 320° C., of likewise 20% by weight and preferably less. This kind of separation and recovery of extraction oil has proved particularly good since the process of the invention requires an extraction oil in which the portion of compounds boiling below 180° C. and compounds boiling above 320° C. should not exceed about 10% by weight. An extraction oil of this kind can thus very simply be recovered in the manner described directly within the condensation of the synthesis products without additional rectifying equipment. The extraction efficiency obtained when using the extraction oil thus obtained was at least as good as the efficiency obtained when using a diesel oil fraction obtained by distillation and boiling between 200 and 280° C.

It was found in certain cases that the synthesis results become gradually more unfavorable and, above all, the formation of methane becomes higher if products obtained from the synthesis proper are used while these difficulties were not encountered when oil from another source was used with the extraction method being the same. Particularly characteristic of the use of products obtained from the synthesis operation was a more or less large decrease in the olefin content of the synthesis products, especially in the content of normally gaseous olefins. This was particularly true in the case of sintered catalysts if a product derived from the synthesis operation and having the appropriate boiling range was directly used for the extraction. However, this detrimental effect on the synthesis results was also shown by fused catalysts while these undesirable phenomena would relatively seldom be observed when using precipitated catalysts.

An examination showed that the undesirable effect of an increased production of methane is encountered especially if the corresponding catalysts, preferably iron catalyts, produce primary products in which the acid component and above all that of the free acids is present to a considerable extent. When considering the fact that free acids are generally contained in a maximum quantity of about 8%, but in general below 5% by weight, e.g. 1–2%, in products of the boiling ranges as used for the extraction, then "considerable amounts" are understood to be such which are in excess of these contents. This is particularly true of a carbon monoxide hydrogenation with the use of sintered and fused catalysts or also of precipitated catalysts of a specific composition, which lead to synthesis products with a high content of oxygenated compounds as, for example, 20% by weight and more, based on total liquid product. It is known that the acid number and also the neutralization number represents a measure of the content of free acids. In a synthesis operation with iron-based sintered catalysts, for example, neutralization numbers of more than 40, i.e. acid contents of more than 6% could be found in a fraction of which 85% boiled between 180 and 320° C. In the case of precipitated catalysts which lead to the preferred formation of hydrocarbons of the low molecular or high molecular weight type, the neutralization number is generally considerably lower as, for example, 5 or less.

Considerably improved results are therefore obtained if the products derived from the synthesis and used for the extraction, prior to being used, are treated with alkaline reacting materials which may be used in amounts considerably in excess of those stoichiometrically required. The increased production of methane and the decrease of the olefin content in the synthesis products will not occur when using extraction agents pretreated in this manner. Practically any alkaline-reacting material may be used for combining with the free acids present. Of particular advantage, however, is the use of alkalis and alkaline earths. These compounds may be used in both, the oxide and the hydroxide form. They are also usable in the form of their carbonates of bicarbonates. It is possible to effect the alkalization of the free acid with a quantity which is considerably in excess of that required, e.g. 10 to 50 times the stoichiometrical quantity.

The treatment with alkalis may be effected with the aqueous solution of the alkaline reacting compounds mentioned above. Thus, for example, it is possible to effect the alkali treatment in countercurrent flow relation in an appropriate countercurrent column with the extraction oil to be treated being passed in upward direction and the aqueous alkali solution being charged to the top of the column. Other working methods as, for example, with a stirrer, are also applicable.

Particularly favorable operation is possible, however, if the alkaline compounds are used in solid form for the neutralization of the aliphatic monocarboxylic acids present. This can, for example, be effected in such a manner as to allow the extraction oil to trickle over the material arranged in solid form in an appropriate column. In another embodiment, the treatment with alkali may be effected in a stirring vessel where upon the extraction oil, after short settling, is directly usable.

Suitable materials for the working method in accordance with the invention are primarily alkalis such as KOH, NaOH, $K_2CO_3$, $NaHCO_3$, etc. Alkaline earths such as MgO or CaO in dissolved, suspended or solid form may also be applied with a good effect. The use of $NH_3$ is also possible in special cases.

It has been found that it is not always necessary to neutralize all of the acids contained in an extraction oil. Thus, with a neutralization number of 35 in an extraction oil, an alkali equivalent of only 7, i.e. as little as 20% of the total amount required for the neutralization has been found to be sufficient for effecting extraction with excellent results. Higher alkali contents do not give a better effect. Therefore, it is sufficient to have a neutralization number-alkali equivalent of about 3–20 and preferably 5–15 in the extraction oil to obtain as low a methane production as possible and optimum olefin contents by the extraction. On the other hand, an alkali treatment of extraction oils having a neutralization number of below 3 and preferably below 1 is not required since a satisfactory extraction without adverse influence on the synthesis results is always possible with extraction oils of this kind.

During the course of extended operating periods, under certain circumstances, a very slight decrease in the conversion occurs after a certain time and may become more pronounced when continuing the operation. It has been found advantageous in this case, as soon as the decrease in conversion becomes perceptible, to effect one or several extractions preferably in succession, e.g. of twice the duration with the quantity of extraction oil used in this time being likewise doubled. By this measure, a complete regeneration of the catalyst surface is reached. Certain small amounts of high molecular weight products which have accumulated on the catalyst surface in spite of having applied the working method of the invention are completely removed.

Small amounts of reaction water often occur in the synthesis product and are condensed, for example, in the intermediate separator. This quantity is generally not sufficiently large as to result in formation of layers, i.e. the water remains dissolved in the oily product. If, due to special circumstances, separation of phases should occur, the lower phase substantially consisting of water must be separated since otherwise an adverse effect on the catalyst activity may occur. The content of water in the extraction oil should not exceed 3% by weight, or preferably 2%, and particularly advantageously should be below 1% by weight.

With the use of the products from the synthesis proper as the extraction oil, the pump used for conveying the extraction oil need only overcome the pressure difference between the reactor outlet and inlet whereas, in accordance with previous working methods and particularly when using extraction oils from an outside source the feed pump had to take suction on the extraction oil at normal pressure and to discharge the same into the synthesis reactor at a pressure ranging somewhat higher than the synthesis pressure involving a much greater power output.

When working, in accordance with the invention, a small increase in the pressure is entirely satisfactory. The synthesis operation is not discontinued during the extraction and the quantity of the extraction oil required for the extraction is pumped over the catalyst within the time provided while the synthesis is proceeding.

As mentioned, the process in accordance with the invention is particularly applicable in connection with catalysts in the form of a fixed-bed. Modern synthesis reactors for fixed-bed catalysts consist chiefly of smooth tubes of 20 to 100 mm. and preferably about 30–60 mm. in diameter and more than 5 meters and preferably 10 to 25 m. in overall length. These tubes are charged with the catalyst produced in the conventional manner being either in the unreduced or, preferably, in the reduced form, in which case special precautions have to be observed in the filling operation as, for example, the use of carbon dioxide or nitrogen as protective gas or the use of paraffin-impregnated catalysts.

This synthesis reactor is started up by relatively rapidly increasing the temperature to 150° C. Following this rapid increase the rate of temperature increase is slowed down as, for example, to 1–2° C. per hour.

The synthesis pressure may preferably range between about 10 and 60 atmospheres, as, for example, 30 atmospheres. The gas load may, for example be 750 liters of gas per liter of catalyst per hour with a recycle ratio of 1 part of fresh gas to 2.5 parts of recycle gas (1+2.5).

The use of the synthesis gas recycling is of advantage in many cases. The process of the invention is, however, not bound to gas recycling. Suitable synthesis gases are all gases containing carbon monoxide and hydrogen and produced by conventional gas production methods. The ratio of CO to $H_2$ in the synthesis gas may vary between about 2:1 and 1:10. The content of $CO+H_2$ in the synthesis gases may vary between about 30 and 100% by volume. Thus, for example, a gas containing 28% CO, 50% $H_2$ is used, the remainder being methane, carbon dioxide and nitrogen may be used.

Under the conditions described above, the first $CO+H_2$ conversion will be observed at temperatures in the region of 190° C.

If, under the conditions mentioned above, the synthesis reaction would be continued in the conventional manner, i.e. an increase in temperature at a more or less uniform rate would be effected without carrying out an extraction, then the further increase in $CO+H_2$ conversion would be relatively slow. For example, in the case of sintered catalysts, a final conversion of about 70% $CO+H_2$ would not be reached under these conditions at a temperature of less than 280–290° C.

The measures in accordance with the invention are generally applied as early as during the initial operation. A periodic extraction of the catalysts is effected in intervals of 4 to 48 hours and preferably in intervals of 4–24 hours. It is particularly favorable to choose as short as possible an extraction time, i.e. less than 60 minutes and preferably less than 30 minutes, it being particularly expedient in many cases to extract in less than 15 minutes. The quantity of extraction oil to be charged to the catalyst within 5 minutes should be chosen so that it is 0.04 to 0.4 times and preferably 0.1 to 0.25 times that of the catalyst volume. These figures apply to reactions having an overall length of about 10 meters. For reactors with overall lengths of about 20 meters, it is most favorable to charge the catalyst within 10 minutes with a quantity of extraction liquid which amounts to 0.04 to 0.4 times and preferably to 0.1–0.25 times the catalyst volume. For reactors with an overall length of about 5 meters, the quantities of extraction oil corresponding to 0.04 to 0.4 times and preferably to 0.1 to 0.25 times the catalyst volume should be charged to the catalyst within as little as 3 minutes. For reactors with overall lengths ranging between these sizes, there apply corresponding intermediate values.

The $CO+H_2$ conversion reached under the above-mentioned conditions is, for example, 70% at a temperature of 245° C.

In accordance with the invention, the catalyst is contacted within a very short time with a relatively large amount of liquid, which removes very rapidly by extraction the high molecular weight compounds deposited within and on the catalyst, remaining there during normal synthesis operation and inhibiting the reaction. The effect of the measure according to the invention, is very impressively demonstrated by the increase in the carbon dioxide content of the gas leaving the reactor. This carbon dioxide value is directly connected with the conversion in the synthesis reaction. It indicates an increase within a time of between about 20 and 60 minutes depending upon the duration of the extraction after which time the catalyst will reach again is optimum conversion.

It has furthermore been found that, in the case of a synthesis with fixed-bed catalysts, a particularly favorable effect with regard to the maintenance of the catalyst activity, formation of methane and life is shown by the extraction method, according to the invention, if a certain pressure drop caused by the extraction or by the short-time supply of relatively large quantities of liquid is observed in the reactor during or immediately after the extraction. This pressure drop ranges between about 0.2 and 5 atmospheres absolute and preferably 0.4 and 2.5 atmospheres absolute. As is known, reactors having an overall length of between about 10 and 20 m. and containing the catalyst in a stationary form as, for example, in the form of spheres or small cylinders having a resistance in the order of magnitude of about 1–10 and preferably about 2–5 atmospheres depending upon the mechanical properties of the catalysts and the gas rate, type of gas, recycle ration and other factors. The figures given above are understood to be in addition to the normal pressure losses observed in the catalyst bed with no extraction being carried out. This "pressure extraction" of the catalyst effects a particularly rapid and complete removal of the polymerized products adhering to the surface of the catalyst so that maximum activity of the catalyst is restored immediately thereafter.

While the extraction, in accordance with the invention, is particularly advantageous in connection with fused and sintered catalysts, the same may be used also in connection with precipitated catalysts. The operation of the synthesis with extraction has caused difficulties in particular cases if it was applied to precipitated catalysts which were stationarily arranged in tubes and had been found to be unusually active. Such highly active precipitated catalysts are carrierless or contain only less than 30 parts of carrier material and preferably less than 15 parts of carrier material based on present iron. As compared with sintered or fused catalysts of analogous composition, these catalysts are substantially more active. They permit the synthesis to be effected at temperatures which are too low for fused or sintered catalysts, especially at elevated gas loads of, for example, 500 parts by volume of gas per part by volume of catalyst per hour. The operation of the synthesis with extraction, beginning with the start-up of a fresh catalyst, could not be carried out successfully in many cases because the increase in activity caused by the extraction resulted in an increase in conversion to such an extent that failures resulted in the catalyst at the gas inlet side, partially accompanied by increased resistance in the synthesis tubes.

It has been found that these difficulties in the process for the hydrogenation of carbon monoxide with the use of cobalt, nickel or preferably iron catalysts in form of highly active precipitated catalysts can be avoided by operating the highly active precipitated catalysts for an extended period of time in the synthesis unit without subjecting them to an extraction.

The precipitated catalysts are operated in the synthesis unit under the usual conditions as, for example, at gas loads of between about 100 and 1000 volumes of gas per volume of catalyst per hour and preferably 250–750 volumes of gas per volume of catalyst per hour and synthesis pressures of between 5 and 50 atmospheres and preferably between 10 and 40 atmospheres. It is possible to work with once-through operation or with recycling of the synthesis gas using, for example, a ratio of fresh gas to recycle gas of 1:1 to 1:5. Since the beginning of the operation with intermittent extraction is partially dependent upon the $CO+H_2$ conversion, and for technical reasons, the $CO+H_2$ conversion should not be too low and should range, for example, above 60% and preferably above 70%, highly active precipitated catalysts may, for example, be operated under the conditions mentioned above between about 210° and 230° C. without subjecting them to the extraction.

If the catalysts are operated for months and any slight decrease in conversion is compensated by correspondingly increasing the temperature, the temperature reached after a given operating period is dependent upon the conversion maintained in this time. If, for example, the $CO+H_2$ conversion is set at 80%, temperatures in the region of 250° C. will be reached after about 4 months. When operating with a conversion of about 70–75%, the same temperatures are required after 5–6 months. Too long an operating period under the usual synthesis conditions without extraction is not advantageous since in this case the production of methane will reach a level which is undesirable from the economic and technical point of view and may increase, for example, to more than 15%.

After several months, such as the said 4 or 5–6 months, the mode of operation with periodical extractions is started. At first, the final reaction temperature maintained is lowered by about 20–30° C. in order to avoid in any case troubles in the synthesis operation. The extraction is then effected in a careful manner. It is preferable to choose an extraction time of about 10–20 minutes and to use a quantity of extraction oil of about 15–20% by volume based on the catalyst contained in the reactor. Naturally, the quantity of extraction oil is dependent upon the type of catalyst and the boiling range of the synthesis products. A catalyst with the preferred production of paraffin will, of course, require more extraction oil than one with the preferred formation of gasoline.

Suitable extraction oils are the diesel oils already mentioned from the various sources and preferably products derived from the synthesis proper and having an appropriate boiling range. The number of extractions is determined by the boiling range of the primary products of the particular catalyst at the time in question. It is possible, for example, to maintain a constant $CO+H_2$ conversion of above 80% with only one extraction after each 6–7 operating days. In many cases, however, the intervals between the extractions will have to be shortened as, for example to 48–72 hours and in special cases even to 24 hours.

Under the extraction conditions stated above, the temperature is adjusted sufficiently high as to obtain the $CO+H_2$ conversion desired which is in general above 60% and preferably above 70%. This mode of operation is maintained until a slight decrease of the conversion occurs. In general, this will be the case not sooner than several months, e.g. 3–6 months, after the beginning of the first extraction. It is preferable to omit a further increase in the reaction temperature at that time and to use somewhat more severe extraction conditions. This may be done, for example, by reducing the extraction time, increasing the quantity of extraction oil or increasing the number of extractions. It is also possible, however, to combine these measures. The synthesis temperature should not be raised until all these possibilities are exhausted.

When using this working method, very long operating periods of, for example, 12, 18 or 24 months can be reached also for precipitated catalysts. In this case, the large increase in the production of methane with a corresponding decrease in the yield of directly usable compounds, as it may be observed in normal operation without extraction as early as after 6–8 months, does no longer occur.

The temperature at which the extraction oil is charged to the catalyst is practically of no importance with regard to the extraction efficiency. It is entirely possible for the extraction product to have room temperature, but in general it should be somewhat warmer and have a temperature of, for example, 30–80° C. Products having a higher temperature may also be used. Care should only be taken that the relatively large amount of liquid charged to the reactor in the short times does not effect a cooling of the synthesis reactor or of its upper part.

The extraction, in accordance with the invention, in connection with fixed-beds and similar operations, must be effected at the intervals specified and if the same is continuously effected as, for example, by continuously feeding the extraction oil over the catalyst or if the intervals between the extraction is too long, the desirable results obtained in accordance with the invention will not be obtained.

The working method in accordance with the invention offers the possibility to extract several reactors in succession with only one pump without adversely influencing the synthesis operation. It is also possible to work continuously with the use of the quantities given above per unit of time. In this case, however, the additional pressure losses incurred are disadvantageous. Moreover, one pump must be used for each of the reactors. The effect obtained in continuous operation is not more favorable than that obtained in intermittent operation.

The invention provides the possibility of greatly improving the synthesis conditions. Thus, with a catalyst which, after an operation period of 3½ months and without having been treated in accordance with the invention, gave a $CO+H_2$ conversion of about 65% (production of methane: 20%) at a load of 500 liters of synthesis gas per liter of catalyst per hour and a synthesis temperature of 268° C., a $CO+H_2$ conversion of more than 70% (methane production: 13–15%) could be reached by extraction while observing the conditions of the invention. In this case, a temperature of only 245° C. was used and a load of 750 liters of synthesis gas per liter of catalyst per hour was made possible. This significant and completely unexpected effect suggests the possibility to increase the catalyst life to an unusual extent in spite of high gas loads. Total service times of the catalysts amounting to 1–2 years and more in spite of the outstanding performance appears to be possible.

The process of the invention is not limited to a carbon monoxide hydrogenation with fixed-bed catalysts. It is also applicable to a working method in which a catalyst suspended in a liquid is used. For this type of synthesis has been referred to as a "liquid phase synthesis," "wet synthesis," "slurry synthesis," or "jiggling-bed synthesis." Extensive studies showed that, in a wet synthesis, the suspending oil originally used is discharged within a relatively short time with the reaction products being formed and that thereafter an equilibrium exists between chiefly high molecular weight reaction products and relatively small amounts of low boiling synthesis products. Due to the preponderant presence of high molecular weight portions, the dissolving effect on the high molecular weight compounds present on and in the catalyst is relatively poor. Because of the continuous or intermittent supply of extraction oil, a considerable decrease in the percentage of high molecular weight compounds in the liquid phase is effected with a simultaneous increase in the portions of low boiling compounds, i.e. in the fraction boiling between about 320 and 380° C. and preferably in the fraction boiling between 180 and 320° C. The result is that the liquid phase continuously dissolves the high molecular weight compounds present in and on the catalyst, i.e. a continuous regeneration of the activity is effected. Thereby, quite analogously to the working method with fixed-bed catalysts, a high activity is obtained at surprisingly low temperatures so that a high $CO+H_2$ conversion with low methane production can be reached in spite of a high gas load. In contrast to the synthesis with fixed-bed catalysts, it is possible in the synthesis effected in a liquid medium to apply a continuous extraction, i.e. to bring about the same effect by the continuous supply of small amounts of extraction oil as that obtained by intermittently feeding larger amounts. It is required in this continuous operation to adjust the quantities of extraction liquid so that the same amount of 0.1–100% by volume and preferably 0.5–20% by volume and most favorably 0.5–10% by volume of the reaction space per unit of time of 60 minutes is introduced, the introduction of the extraction liquid being preferably effected at the bottom of the reactor.

Of decisive importance for the proportioning of the proper amount is the fact that the portion of high molecular weight compounds in the liquid phase should range below 50% and preferably below 25% and most favorably below 10%. Higher molecular weight compounds are understood in this case to be such boiling above 320° C. It is preferable for the proper adjustment of the ratio of compounds boiling below 320° C. to compounds boiling above 320° C. to distill several samples and to adjust the quantity of extraction oil per unit of time in accordance with the result.

A special embodiment has proved good for the synthesis with iron catalysts suspended in liquids. This embodiment involves batchwise or preferably continuous feeding of larger amounts of low boiling compounds having a boiling range of about 180–320° C., preferably hydrocarbons, into the reactor. The amounts should be sufficiently low that the portion of higher molecular weight hydrocarbons boiling above 320° C. does not account for more than 50% by volume and preferably less than 25% by volume of the suspending liquid which is known to effect the hydrogenation of carbon monoxide with catalysts suspended in liquids in such a manner that a relatively low boiling fraction of, for example, the diesel oil boiling range is generally used as the liquid medium in the initial operation of such catalysts, this liquid medium enriches more or less rapidly during the course of the synthesis with high boiling products boiling preferably above 320° C. so that, after a more or less long operating period, all of the liquid medium includes practically only high boiling hydrocarbons and smaller portions of oxygenated compounds with relatively small amounts of low boiling hydrocarbons dissolved therein. These amounts are dependent upon the particular synthesis pressure and the synthesis temperature.

It has now been found that the presence of large amounts of high molecular weight hydrocarbons and their high concentration in the suspending liquid is the reason for the fact that, in a liquid-phase synthesis, it is practically impossible for the gas load of the catalyst and the conversion to exceed a certain limit. If care is now taken by the measures in accordance with the invention that the content of high molecular weight hydrocarbons does not exceed a certain maximum, then a considerable increase in conversion very surprisingly occurs. It is even possible in many cases to increase at the same time the gas load and/or to decrease the reaction temperature.

The liquids to be fed are such which are known for the extraction of carbon monoxide hydrogenation catalysts. Preference is given, however, to the use of hydrocarbon compounds which are derived from the synthesis operation proper and boil between about 180 and 320° C. and are mixed, as the case may be, with oxygenated compounds. It is also possible to use fractions of a narrower boiling range. The portion of products boiling above 320° C. in these fractions is preferably below 20% and most favorably below 10% by volume.

The portion of hyrdocarbons boiling below 180° C. in the liquid to be charged should likewise be kept below 40% by volume and preferably below 30% by volume, it being particularly advantageous to use hydrocarbon mixtures containing less than 20% by volume of hydrocarbons boiling below 180° C.

The extraction oil used should preferably contain no appreciable content of acids. The neutralization number should range below 10 and preferably below 5. Otherwise care should be taken by a treatment with alkali or alkaline earths that the neutralization number is appropriately lowered. Particularly suitable for the treatment with lye are the hydroxides, bicarbonates or carbonates of the alkalis or alkaline earths. Ammonia is also suitable under certain circumstances.

The synthesis itself is effected under the conditions usual for a wet synthesis, i.e. at synthesis pressures of between about 5 and 50 atmospheres and preferably 10 and 30 atmospheres. The gas load may range between 100 and about 600 volumes of gas per volume of catalyst per hour.

Recycling of synthesis gas to the usual extent as, for example 1 part of fresh gas per part of recycle gas or 1 part of fresh gas per 2 parts of recycle gas is possible without difficulty. The ratio of carbon monoxide to hydrogen in the synthesis gas may be varied within wide limits. It is possible, for example, to favorably process gases rich in carbon monoxide having a $CO:H_2$ ratio of 1.5:1, but also hydrogen-rich gases containing CO and $H_2$ in a ratio of 1:2 may be charged.

In accordance with the invention when used with the wet synthesis, the batchwise feeding of the extraction oil is effected as early as at the beginning of the synthesis. It is also possible to start the feeding at any other time thereafter. The quantity to be applied naturally depends on whether the particular wet synthesis is effected with the preferred production of low molecular or high molecular weight compounds. In the former case, considerably less extraction oil will be required.

When correspondingly choosing the catalyst with regard to composition and mode of preparation, and the other operating conditions, it is possible to estimate the approximate boiling range of the products formed during the synthesis and consequently the quantity of hydrocarbons boiling above 320° C. and formed per unit of time. Since the synthesis is generally started with a hydrocarbon fraction boiling between about 180 and 320° C. as the suspending liquid it is also possible on the basis of the estimated content of products boiling above 320° C. in the suspended liquid to estimate the quantity of extraction oil which is fed batchwise, e.g. in intervals of 6, 12 or 24 hours, or longer in the case of a gasoline synthesis, or continuously. These results are periodically checked by taking samples from the suspending liquid and determining whether or not the content of products boiling above 320° C. exceed the permissible limits.

If the synthesis is operated with catalysts for which the production of products boiling above 320° C. is not known, the quantity of extraction oil must be determined by initially taking samples in shorter intervals.

The processing of the liquid product leaving the reactor is effected in the manner usual for liquid-phase synthesis operations. It is advantageous in many cases to directly recover an extraction oil which meets all requirements by partial condensation in a certain temperature range.

The feeding of the extraction oil in a liquid-phase synthesis as well as the introduction of the synthesis gas is effected in the bottom part of the reactor either through a nozzle or through an immersion pipe. It is advantageous to introduce the two media commonly, e.g. through concentric tubes, nozzles or similar devices.

It is true that it has been suggested to continuously add low boiling hydrocarbons in carrying out the liquid-phase synthesis. This continuous addition of low boiling hydrocarbons served the purpose of removing a more or less large amount of the reaction heat by evaporation thereby effecting a careful treatment of the catalyst. This measure is, however, by no means identical with the working method in accordance with the invention. The continuous addition of low boiling hydrocarbons such as hexane, heptane or octane, etc., or of appropriate mixtures does not show the effect of the measures in accordance with the invention. This effect cannot be obtained because by far the greatest part of the said hydrocarbons evaporates immediately after having been fed to the synthesis reactor and the balance, due to its relatively low boiling range, is in any case unsuitable for the extraction of the high molecular weight compounds contained on and in the catalyst, as stated above. Thus no extraction takes place at all.

The process in accordance with the invention is also applicable to a carbon monoxide hydrogenation with the use of a fluidized catalyst bed or a synthesis operating by what is known as the moving-bed process. As is known, a certain difficulty of these two types of synthesis consists in that the dust-like catalyst frequently has the tendency to cake together or to agglomerate due to the practically unavoidable formation of small amounts of paraffin. Thereby, a more or less pronounced collapsing of the fluidized bed will occur under certain circumstances and in any event the synthesis operation will at least be disturbed. When using the process of the invention in carrying out these types of synthesis, it is advantageous to operate in such a manner that a purification of the catalyst surface is effected by spraying the extraction liquid. Thereby, small residues of high molecular weight compounds are also removed from the catalyst surface so that the deposition of paraffin which results in the troublesome caking mentioned above does no longer occur. It is possible to work analogously to the working method described for fixed-bed catalysts as well as in accordance with the principle of the extraction in the liquid-phase synthesis.

The extractions according to the invention are effected at the synthesis temperatures, i.e. in the temperature range between 150° and 400° C. and preferably at 200–300° C.

When using cold extraction oil, the reaction temperature in the synthesis reactor should not drop by more than 25° C. and preferably by not more than 10° C. during the extraction.

According to a special embodiment of the process, the hydrogenation of carbon monoxide may be effected with carbon monoxide and steam as the reactants entering the reactor. In this case, the steam, in part under the action of the catalysts, is reacted with the carbon monoxide to form carbon dioxide and hydrogen, and these gases enter the synthesis reaction proper. (See U.S. Patent 2,579,663.)

The process of the invention is effected in any case with the synthesis gases and liquid extraction agents being passed in the same direction over the catalyst, the preferred direction being downward. This mode of operation may also be applied in hydrogenating carbon monoxide with catalysts suspended in liquids. However, in this case the synthesis gases and the extraction oil will preferably pass in upward direction.

Figure 2:
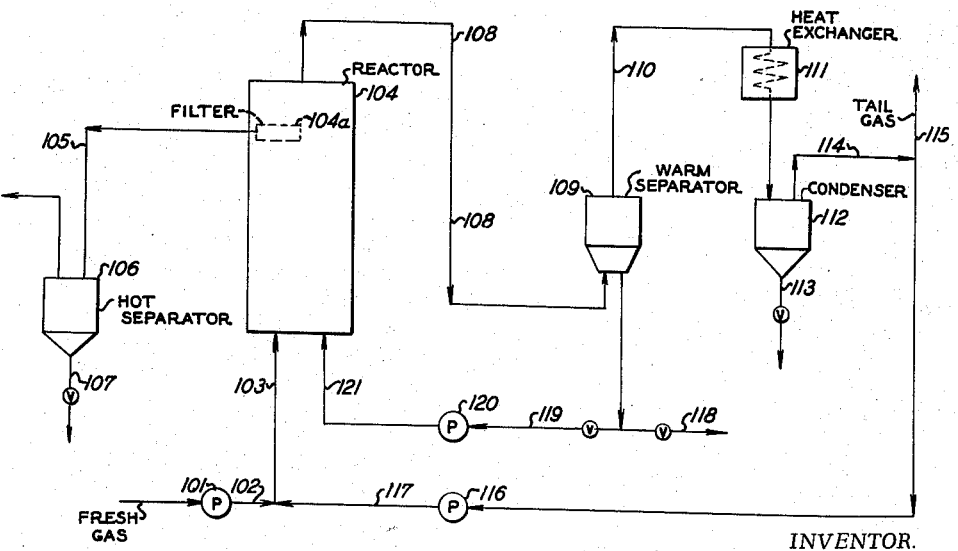

With reference to the drawings, Fig. 1 shows a flow diagram of a synthesis and extraction operation in accordance with one embodiment of the invention using a fixed bed catalyst, Fig. 2 shows a flow diagram similar to that of Fig. 1 in which a neutralization step for a portion of the extraction product is included in the operation, and Fig. 3 shows a flow diagram of a synthesis and extraction operation in accordance with a further embodiment of the invention using a catalyst suspended in liquid phase.

The feed gas containing carbon monoxide and hydrogen as indicated in Fig. 1 is forced by pump 1 through lines 2 and 3 into upright elongated reactor 4 containing a hydrogenation catalyst for the gas in a fixed bed, such as an iron, cobalt, or nickel catalyst. Elevated temperatures and pressures above about 8 atmospheres are used for the synthesis reaction.

The hydrogenated reaction products leave the reactor 4 by line 5 and pass into the bottom of hot separator 6 around which steam at about 2.5 atmospheres is circulated in a steam jacket 6'. The liquid portions recovered in this separator are drawn off at the bottom by line 7, while the remainder of the hydrogenation products are passed by line 8 to the bottom of air-cooled warm separator 9 which is packed with suitable material such as Reschig rings. A portion of this product is drawn off by line 18. This portion includes, in addition to the fractions within the usual boiling range of diesel oil, about 10–20% of compounds boiling above 320° C. and substantial portions of compounds boiling below about 180° C. The remaining synthesis products which leave separator 9 by line 10 at the top end thereof are cooled in a heat exchanger 11 and thence enter the top of cold separator or condenser 12. The heavier portions of this cooled product are drawn off at 13 while the lighter volatile components pass through line 14 wherefrom tail gas is removed at 15. The remaining gas from line 14 is recycled by pump 16 through line 17 to line 3 for admixture with fresh gas from line 2 and reenters the reactor 4 whereby the cycle is repeated.

When the synthesis catalyst bed has become exhausted, without stopping the synthesis reaction, an extracting agent therefor, such as a hydrocarbon liquid extracting agent containing more than 50% of compounds boiling between about 180 and 320° C., is periodically passed in shock-like manner into the reactor and through the fixed bed catalyst to effect a substantially complete removal of high molecular weight products adhering to the surface of said catalyst.

As shown in Fig. 1, the particular extracting agent is the liquid hydrocarbon synthesis product removed from warm separator 9 by line 18. This liquid agent is periodically passed through line 19 and is forced by pump 20 through line 21 into the reactor 4.

In this way, the liquid extracting agent may be periodically drawn off from the appropriate point in the main process and recycled to the reactor for extraction of the catalyst bed and removal of high molecular weight materials adhering thereto without stopping the main synthesis reaction.

Fig. 2 illustrates a similar flow diagram to that of Fig. 1, but which additionally includes in line 19 a neutralization zone 22 containing alkaline reacting materials for treating hydrocarbon liquid extraction product having a high acid content. Neutralization zone 22 is connected by line 23 to container 24 wherein the neutralized hydrocarbon liquid extraction product may be kept for use when needed. This neutralized product may simply be fed through pump 20 and recycled to the reactor.

Fig. 3 illustrates the employment of a catalyst suspended in a liquid medium in the reactor. In this embodiment, fresh gas is forced by pump 101 through line 102 and line 103 into the bottom of liquid filled reactor 104 having the synthesis catalyst suspended therein. A portion of the hydrocarbon synthesis product is filtered from the suspended catalyst particles by filter 104a and passes by line 105 to the top of hot separator 106. The condensing liquid may be drawn off by line 107. A further portion of the synthesis product is passed by line 108 to warm separator 109 similar to warm separator 9 of Fig. 1. The lighter components are passed by line 110 to heat exchanger 111 for cooling and thence to separator or condenser 112. The condensing products may be drawn off by line 113 while the volatile components pass by line 114 to tail gas recovery line 115. A portion of the remaining gas is recycled by pump 116 through line 117 and line 103 back to the reactor. The condensing components from separator 109 may be drawn off by line 118 while a portion thereof may be periodically recycled through line 119, pump 120 and line 121 back to the reactor for shock extraction of the suspended catalyst. This portion contains the same components as those passing from separator 9 through line 19, pump 20 and line 21 to reactor 4 as shown in Fig. 1.

The following examples are given by way of illustration and not limitation:

*Example 1*

100 parts of iron and 25 parts of copper, both in powder form of the highest oxide stage were intimately mixed with 10 parts of ZnO on a rotating plate and then mixed with crushed potassium carbonate in a ball mill whereupon the mixture was again thoroughly stirred. The mixture contained 4 parts of $K_2O$ in the form of potassium carbonate per 100 parts of iron. By gradually spraying on water, a spherical product was obtained which, by means of a vibrator, was sieved to a grain size of between 2 and 3.5 mm. The oversized grains were crushed and returned into the process; the undersized grains were also returned to the rotating plate.

The sieved grains were dried for 24 hours at 120° C. Thereafter, the water was practically completely removed.

Following this, the grains were sintered for 30 minutes at 1150° C. This was followed by a reduction at 350° C. effected for 4 hours with a $H_2/N_2$ mixture at a flow velocity of 1.5 meters/second measured linear and cold. The reduction value or the content of free iron in the catalyst was thereafter about 95%.

8 liters of this catalyst were filled into a vertical reaction tube of 32 mm. in inside diameter and 10 meters in length. Thereafter, a synthesis gas including about 27% of carbon monoxide, 54% of hydrogen, the balance being methane, carbon dioxide and nitrogen, was charged at a rate of 500 parts by volume of gas per part by volume of catalyst per hour. The synthesis pressure was 30 atmospheres. Part of the tail gas was recycled in such a manner as to have a recycle ratio of 1:2.5, i.e., 2.5 parts of recycle gas per part of fresh gas.

The catalyst was brought into operation in a careful manner. The $CO+H_2$ conversion was about 50% after 170 hours and about 60% after 250 hours. At 265° C., a $CO+H_2$ conversion of 70% was reached. The production of methane was 18%, the consumption ratio 1.45.

After about 1000 hours, a hydrogen-rich gas containing CO and $H_2$ in a ratio of 1:3 was used instead of the gas mentioned above. During this experiment, the reaction temperature was increased by 2° C. The $CO+H_2$ conversion was about 68%, the production of methane 20–21% and the consumption ratio about 2.0.

After 2000 hours, the catalyst was extracted at atmospheric pressure using at first diesel oil at about 200° C. and then a gasoline fraction at about 120° C. After having taken the catalyst again into operation, a CO+$H_2$ conversion of 68% was reached at a temperature of only 230° C. However, within 6 days an increase in temperature by 35° C. had to be effected to maintain the conversion at this level. No intermediate extractions had been effected.

After 2300 hours, the catalyst was again extracted at atmospheric pressure in the manner described above and thereafter taken again into operation under the previous conditions at 230° C. In addition, the catalyst was continuously sprayed with diesel oil at a rate of 100 cc. of diesel oil per hour. In spite of this measure, a continuous increase in temperature had to be effected analogously to the first experimental step in order to keep the CO conversion at the initially observed level of about 70%. Also in this case, the final temperature was about 265° C.

After 2500 hours, another extraction of the catalyst was effected in the manner described above. Thereafter, the catalyst was again taken into operation at 230° C. under the previous conditions except that a CO:$H_2$ ratio of 1:2 was now used as at the beginning of the experiment. Moreover, periodic extractions were effected in intervals of 12 hours, each extraction lasting 5 minutes and being carried out with 1.5 liters of diesel oil (boiling between 200 and 260° C.) without shutting down the synthesis operation. Under these conditions, a CO+$H_2$ conversion of about 72% could be obtained at 230° C. while the production of methane decreased to 14%. The consumption ratio was practically unchanged ranging between 1.5 and 1.6.

After 2800 hours the gas load was increased to 750 liters of fresh gas per liter of catalyst per hour. The synthesis pressure was not changed and amounted to 30 atmospheres. The reaction temperature was increased to 245° C. The recycle ratio was 1:2.

Under these conditions, a constant CO+$H_2$ conversion of 71% could be maintained up to the 3500th hour. The production of methane was about 16% and the consumption ratio about 1.4.

During this time, periodic extractions were effected in intervals of 8 hours, each extraction lasting 10 minutes and being carried out with 1000 cc. of diesel oil.

After the termination of this step of the experiment, the operation was continued under the previous conditions except that the extractions effected in the same intervals were now carried out with a product derived from the synthesis proper. For example, between the 3700th and 3800th hour there was used a synthesis product which showed no separation of paraffin at room temperature and included 18% of constituents boiling up to 180° C. During this period of 100 hours no change of the synthesis results with regard to conversion, production of methane, consumption ratio and temperature range occurred.

Following this, the extractions were effected with a synthesis product which, in contrast to that mentioned in the preceding paragraph, contained about 30% of constituents boiling below 180° C. In this case the CO+$H_2$ conversion decreased from about 71% to 65% while maintaining the previous extraction conditions.

After this step of the experiment, a diesel oil fraction boiling between 200 and 260° C. was again used for the extraction. The CO+$H_2$ conversion did not change and remained between 70 and 71% and the production of methane remained between 14 and 16%.

After a total of 4000 operating hours, the last step of the experiment was terminated because of a breakdown and the catalyst was extracted in the reactor at normal pressure in the manner described in the beginning.

Thereafter, the catalyst was started up again at a gas load of 1000 liters per liter of catalyst per hour, a recycle ratio of 1:2 and a pressure of 30 atmospheres using a synthesis gas having likewise a CO/$H_2$ ratio of 1:2. Beginning as early as with the startup, periodic extractions were effected in intervals of 8 hours, each extraction lasting 13 minutes and being effected with 2.5 liters of diesel oil.

Under these conditions, a CO+$H_2$ conversion of about 64% was obtained at 255° C. The production of methane was 14%, the usage ratio in the region of 1.38.

If the extractions were effected in intervals of 6 hours with the individual extractions lasting 6 minutes and being carried out with 1.3 liters of diesel oil each, then an increase in CO+$H_2$ conversion to about 71% was reached while maintaining the previous synthesis temperature. The production of methane was between 15 and 16%, the usage ratio was 1.4. The experiment could be operated under these conditions up to 7000th hour without any change of the temperature range and the synthesis results. Thereafter, it was discontinued in order to have the synthesis tube available for a new experiment.

*Example 2*

A catalyst of the same composition and prepared in the same manner as that of Example 1 except that the grain size was about 1.5 to 4.0 mm., was taken into operation in a reaction tube of 10 meters in length and 32 mm. in inside diameter with a synthesis gas including about 28% CO, 56% $H_2$, the remainder being methane, nitrogen and carbon dioxide. The synthesis pressure was 30 atmospheres and the gas load was 500 liters of gas per liter of catalyst per hour. At a temperature of 267° C., a CO+$H_2$ conversion of about 73% was reached. The formation of methane was 15–16% and the usage ratio ranged between 1.5 and 1.6.

After about 1500 hours, a gas somewhat richer in hydrogen and having a CO:$H_2$ ratio of 1:2.3 was used. This resulted in a CO+$H_2$ conversion of 69–70% while the methane production remained unchanged, viz. 15–16%, and the consumption ratio increased to 1.6–1.7.

After 2600 hours, this experiment was operated with twice the gas load without any intermediate treatment, i.e., 1000 liters of synthesis gas were now used per liter of catalyst per hour. At a temperature of 269° C., the CO+$H_2$ conversion dropped to about 44%.

After an extraction at atmospheric pressure as described in Example 1, the catalyst was again operated at a temperature of 230° C. and a gas load of 500 liters of gas per liter of catalyst per hour. The CO+$H_2$ conversion obtained at this temperature dropped within 24 hours to 45% and a continuous increase in temperature to 265° C. and had to be effected in order to reach a conversion of about 70–72%.

Up to the 3800th hour, repeated extractions of the catalyst had been effected at atmospheric pressure. It appeared, however, that a high activity, perceptible by high conversions at temperatures in the region of 230° C., was present after having restarted the operation, but was maintained for only about 24–48 hours if no further extractions were carried out. Thereafter, the conversion constantly decreased. This decrease in conversion could each time only be compensated by correspondingly increasing the temperature.

After having effected another extraction at atmospheric pressure between the 3780th and 3800th hour using at first diesel oil and then a gasoline fraction, the reactor was again charged with a gas consisting of about 28% CO, 56% $H_2$, the remainder being nitrogen, methane and carbon dioxide. The load of fresh gas was now 750 liters per liter of catalyst per hour, the recycle ratio was 1:2.0 and the synthesis pressure 30 atmospheres. From the beginning, periodic extractions were effected in intervals of 8 hours using 1000 cc. of diesel oil which was charged within 10 minutes. At 250° C., a CO+$H_2$ conversion of 65% was reached. The production of methane was 18%.

Between the 3900th and 4000th hour, the intervals between two successive extractions were increased to 12 hous using, however, 2000 cc. of diesel oil within 10 minutes for the extraction. Thereafter, the $CO+H_2$ conversion increased to about 67%.

If the intervals were decreased to 8 hours while maintaining the quantity of diesel oil mentioned above, a further increase in conversion to about 70% was observed.

An intermediate extraction with a synthesis product derived from a heat exchanger and including about 32% of constituents boiling below 180° C. resulted in a decrease in conversion to about 58%.

After a total of 4200 operating hours, the gas load ($CO:H_2=1:2$) was increased to 1000 liters of gas per liter of catalyst per hour. At the same time, the synthesis temperature was increased to 255° C. The extraction of the catalyst was effected at first in intervals of 4 hours, then of 6 hours and thereafter of 8 hours using for each extraction 2-2.5 liters of diesel oil within 12, 8 and 5 minutes, respectively. Under these conditions, the conversion increased from 63 to 68 and thereafter to more than 70%. The production of methane was between 14 and 15%, the consumption ratio in the region of 1.4.

After a total operating period of 6000 hours under constant operating conditions and synthesis results between the 42000th and 6000th hour, extractions of the reactor with extraction oil derived from the synthesis operation were started. The extraction oil contained about 12% of constituents boiling about 320° C. and 10% of constituents boiling below 180° C. Under these conditions, the $CO+H_2$ conversion was 74–75%. The formation of methane ranged between 16 and 18%.

*Example 3*

A catalyst mass was precipitated by adding a sufficient quantity of a boiling solution of the nitrates of iron and copper in a ratio of 100 Fe:5 Cu to a boiling soda solution to obtain a pH value of 7. This catalyst mass was then washed with hot condensate to a residual alkali content of about 0.3%, calculated as $K_2O$ and based on iron. This washed mass was suspended in condensate at room temperature and mixed with a solution of potash water glass containing sufficient silicic acid as to have 25 parts of $SiO_2$ per 100 parts of Fe. Thereafter, sufficient nitric acid was added that, after filtration, the residual potassium content was 5%, calculated as $K_2O$ and based on iron. The mass was superficially dried, shaped in a suitable equipment to small cylinders of 3.5 mm. diameter and subsequently dried for 24 hours at 105° C. The residual water content was about 8%.

After sieving to a grain size of between 1.5 and 4 mm., this catalyst was reduced for 60 minutes at 230° C. with a mixture consisting of 75% $H_2$ and 25% $N_2$ using a flow velocity of about 1.5 meters/second. Thereafter, the reduction value or the content of free iron was 26%. 8 liters of the reduced catalyst were carefully filled into a synthesis tube of 10 meters in length and 32 mm. inside diameter with the use of carbon dioxide as protective gas and taken into operation with a synthesis gas, the $CO+H_2$ content of which was 85% and the $CO:H_2$ ratio of which was 1:1.7. The synthesis pressure was 25 atmospheres, the recycle ratio was 1:2.5 and the gas load was 500 liters of gas per liter of catalyst per hour.

After careful starting-up for a period of about 120 hours, a conversion of $CO+H_2$ of 72% was obtained at a temperature of 220° C. The production of methane at this time was about 5% and the usage ratio was about 1.5.

Under these conditions, the catalyst could be operated for 2½ months. Thereafter, a gradual increase in temperature became necessary in order to compensate for a slow decrease in activity. After a total of 8000 operating hours, the final temperature was 264° C., the $CO+H_2$ conversion was about 68% and the production of methane had increased to 30%.

After this time, the catalyst was extracted at atmospheric pressure under the conditions set forth in Example 1 and thereafter taken again into operation under the previous conditions. From this time, diesel oil in amount of 1.3 liters was charged within 6 minutes to the catalyst every four hours. After starting-up in a careful manner, a $CO+H_2$ conversion of 70–71% was obtained at a reaction temperature of 230° C. Thus, the reaction temperature was now by 40° C. lower than the temperature after an operating time of 8000 hours. The production of methane which was at that time 30% decreased to 12–14%, and the consumption ratio had increased from 1.4 to 1.5. These results have been ascertained in the 8300th operating hour.

It finally appeared that the number of extractions could be reduced from 6 to 3 per day without encountering a change in the synthesis results. However, a temporary extension of the interval between two successive extractions from 8 to 24 hours resulted in a decrease in conversion to 66%. Thereafter, the operation was continued with 3 extractions per day.

After 8700 operating hours, the number of extractions was decreased to 2 per day while maintaining the quantity of diesel oil added within 5 minutes. The synthesis results remained practically constant.

After an operating period of 9600 hours, a product derived from the synthesis operation proper was used instead of the diesel oil used so far. This product contained about 10% of constituents boiling below 180° C. and about 10% of constituents boiling above 320° C. The extraction times and intervals remained unchanged and so did the $CO+H_2$ conversion. The production of methane was about 10–12%. Under these condition, the above experiment could be continued for months without the necessity of any increase in temperature or other change in the synthesis conditions.

For comparison, the following figures may be given: When conducting the synthesis in the original manner, a reaction temperature of 230° C. was reached after 3500 hours. The $CO+H_2$ conversion was 71%, the production of methane 14–15%.

Within the following weeks, a gradual increase in temperature had to be effected so that 240° C. were reached after a total of 5600 operating hours. At that time, the $CO+H_2$ conversion was unchanged at about 70%. The production of methane, however, had increased to 20%.

Thus, within a period of time of 2100 hours corresponding to 3 months, an increase in temperature of 10° C. was required in normal synthesis operation without catalyst extraction while the production of methane had increased from about 14% to 20%. In contrast to this, an increase in temperature was not required within a period of time of 3 months and more calculated from the beginning of the mode of operation with catalyst extractions which was started after 11 months of normal synthesis operation without extraction. The reaction temperature could be kept unchanged at a level of 230° C. The production of methane remained likewise unchanged at a level of 12% and was thus surprisingly lower than at the time when the corresponding formation of methane was determined at 230° C. in normal operation. The boiling range of the gaseous and liquid products after about 3500, 5600 and 9900 hours, respectively, was as follows:

|  | 3500 hrs. | 5600 hrs. | 9900 hrs. |
| --- | --- | --- | --- |
|  | Percent | Percent | Percent |
| $C_3$–$C_4$ | 16 | 23 | 18.5 |
| $C_5$–$C_{10}$ | 40 | 46 | 37.5 |
| $C_{11}$–$C_{18}$ | 24 | 18 | 22.5 |
| above $C_{18}$ | 20 | 13 | 21.5 |

The olefin content was as follows:

|  | | | |
| --- | --- | --- | --- |
| $C_3$–$C_4$ | 50 | 45 | 58 |
| $C_5$–$C_{10}$ | 60 | 57 | 65 |
| $C_{11}$–$C_{18}$ | 45 | 42 | 59 |

Example 4

A sintered catalyst was prepared in the manner set forth in Example 1 except for the composition of the catalyst which was now 100 parts Fe, 10 parts Cu, 10 parts ZnO and 4 parts $K_2O$ in the form of potassium carbonate. The reduction was likewise effected under the conditions of Example 1.

8 liters of this catalyst were filled into a vertical synthesis tube of 10 meters in length and 32 mm. in inside diameter. The catalyst was operated with a synthesis gas which had a $CO:H_2$ ratio of 1:2 and a $CO+H_2$ content of 85%. The synthesis pressure was 30 atmospheres, the gas load 1000 liters of gas per liter of catalyst per hour, and the recycle ratio was 1:2.

As early as from the beginning of the start-up, periodic extractions were effected in intervals of 6 hours, each reaction lasting 5 minutes and being carried out with 2 liters of diesel oil.

Under these conditions, a $CO+H_2$ conversion of 70–75% was obtained at a temperature of 256° C. The production of methane was between 14 and 16% and the usage ratio was about 1.45.

Beginning with the 700th hour, the catalyst was extracted with a diesel oil obtained in the synthesis proper and containing about 9% of constituents boiling above 320° C. and 8% of constituents boiling below 180° C. Under these conditions, the catalyst could be operated for months at unchanged temperature and with practically constant synthesis results.

After a total operating period of 4 months, the extraction oil derived from the synthesis operation and having a neutralization number in the region of 35 was treated with alkali. This was done in such a manner as to treat the particular quantity of extraction oil for about 10 minutes in a stirring vessel with 20 times the stoichiometrical quantity of solid KOH or $K_2CO_3$. Thereafter, the mixture was allowed to settle and the top layer consisting of a clear liquid was used for the extraction. After the treatment with alkali, the neutralization number was only 7. The quantities remained unchanged as compared with the previous conditions.

It was possible in this manner to reduce the production of methane from formerly 16% to about 9–10%. At the same time, the olefin content in the normally gaseous hydrocarbons increased by about 15–20% and in the gasoline fraction boiling between 30 and 180° C. by about 5–8%.

After additional 2 months, the alkali treatment of the extraction oil derived from the synthesis operation was effected in such a manner that the extraction oil, in a countercurrent column, was continuously contacted with an aqueous solution containing 30 grams of sodium carbonate per liter and passing in a downward direction through said column. The countercurrent column was filled with Raschig rings. The extraction oil leaving the column had still a neutralization number of 15. When using this product as extraction oil, practically the same results were obtained as by the treatment described above of extraction oil with solid alkali compounds.

In two further experiments, the treatment with alkali was effected at 50° C. while it had previously been carried out at room temperature. It was possible in the first case to cut the stirring time by one-half with the neutralization number being the same. In the second case, the neutralization number could be reduced from 15 to about 9–10.

Example 5

A precipitated catalyst including 100 parts Fe, 0.5 parts Cu, 7.5 parts CaO, 5.4 $K_2O$ and 25 parts $SiO_2$ was prepared in accordance with Example 3. The parts given above are by weight, based on total iron present. This catalyst was reduced for 90 minutes at 280° C. with a mixture including 75% $H_2$ and 25% $N_2$. Thereafter, the reduction value or the content of free iron was 41%.

About 160 liters of this catalyst were filled under carbon dioxide protection into a vertical reactor of 12 meters in length containing 17 tubes of 32 mm. in inside diameter. The synthesis gas used had the following composition: 35% CO, 50% $H_2$, 12% $N_2$, the balance being carbon dioxide and methane. The gas load was 500 liters of gas per liter of catalyst per hour and the synthesis pressure was 25 atmospheres. A recycle of 1:2.5 was used.

After starting-up in a careful manner within about 170 hours, the catalyst reached a $CO+H_2$ conversion of 68% at a reaction temperature of 240° C. The production of methane was 13–14%. With the operating temperature being kept constant, a decrease in conversion to about 51% occurred during the course of the following 3 months.

From this time, the catalyst was extracted in intervals of 18–24 hours using 28 liters of diesel oil which were charged within 5 minutes. Immediately after this extraction, the $CO+H_2$ conversion increased to 75% and decreased within a time of between 18 and 24 hours to about 71–72%. The production of methane which was about 20% immediately before the beginning of the extractions dropped to 14–15%.

The reactor could be further operated for months at constant synthesis conditions and synthesis results without any increase in temperature.

Example 6

An iron catalyst including 100 parts of iron, 5 parts of copper, 5 parts of $K_2O$ and 25 parts of $SiO_2$ and prepared by precipitation was shaped to small cylinders of 3 mm. diameter and reduced for 1 hour at 225° C. in such a manner as to have a content of free iron of 26%, based on total iron.

This catalyst was filled into a reactor equipped with 5 tubes of 12 meters in length and 32 mm. in inside diameter and operated under the following conditions: Synthesis pressure, 25 atmospheres; gas load, 500 volumes of gas per volume of catalyst per hour; recycle ratio, fresh gas to recycle gas $=1:2.5$; synthesis gas, $CO:H_2 =1:1.7$, $CO+H_2=87\%$. A $CO+H_2$ conversion of 80% was reached at a reaction temperature of 235° C.

After 2½ months' operation with constant conversion, the reaction temperature was 245° C.

After this time, the extractions were started. At first, the reaction temperature was decreased by 25° C. There was effected one extraction per day with a quantity of extraction oil of 25% by volume of the catalyst volume being charged within 10 minutes. Thereafter, the reaction temperature was adjusted so as to obtain again a conversion of 80% which was the case at 225° C.

The reactor could then be operated satisfactorily for about 3 months. Thereafter, a slowly increasing pressure loss occurred so that it was necessary after additional 14 days to shut down the reactor and to discharge it.

In another experiment under the same conditions, the operating time without extractions was extended from 2½ to 4½ months before the extractions were started.

It was possible in this manner, by the mode of operation with extractions, to reach an additional operating time of more than 7 months at a practically constant synthesis temperature and without any trouble.

We claim:
1. In the process for the catalytic hydrogenation of carbon monoxide in which a synthesis gas containing carbon monoxide and hydrogen is passed in contact with a synthesis catalyst selected from the group consisting of nickel, cobalt and iron catalysts in which said catalyst is in the form of a fixed bed, in a reaction zone under synthesis conditions of elevated temperature and a synthesis pressure in excess of about 8 atmospheres, the improvement which comprises periodically extracting the catalyst for extraction periods of not more than about

60 minutes with a large quantity of a hydrocarbon liquid extracting agent for a carbon monoxide hydrogenation catalyst, in which said liquid extracting agent contains more than 50% of compounds boiling between about 180 and 320° C., to effect a substantially complete removal of high molecular weight products adhering to the surface of said catalyst, while continuing the synthesis gas flow in contact with the catalyst.

2. Improvement according to claim 1 in which said contacting is effected at a pressure between about 10 and 60 atmospheres.

3. Improvement according to claim 1 in which said extractions are effected for extraction periods of less than about 30 minutes.

4. Improvement according to claim 1 in which said extractions are effected for extraction periods of less than about 15 minutes.

5. Improvement according to claim 1 in which said synthesis catalyst is a highly active precipitated catalyst containing less than 30 parts of carrier material per 100 parts of catalyst metal, and in which said contacting of the synthesis gas with the catalyst is effected for an extended period of time of about several months prior to said periodic extraction.

6. Improvement according to claim 1 in which said catalyst is in the form of a fixed bed and in which said bed has a gas flow resistance of about 0.2–5 atmospheres absolute at least one of during and immediately after the extraction.

7. Improvement according to claim 6 in which the catalyst bed has a gas flow resistance of about 0.4–2.5 atmosphere absolute at least one of during and immediately after the extraction.

8. Improvement according to claim 1 in which said catalyst is selected from the group consisting of sintered and fused catalysts.

9. Improvement according to claim 1 in which said catalyst is positioned in said reaction zone in the form of a fixed bed and in which the quantity of said liquid extraction agent used in said extractions corresponds to a quantity of liquid of 0.04–0.4 times the catalyst volume in a period of three minutes for a catalyst bed length of about 5 meters, in a period of about 5 minutes for a catalyst bed length of about 10 meters and for a period about 10 minutes for a catalyst bed length of about 20 meters.

10. Improvement according to claim 9 in which said catalyst is positioned in said reaction zone in the form of a fixed bed and in which the quantity of said liquid extraction agent used in said extraction corresponds to a quantity of liquid of 0.1–0.25 times the catalyst volume, in a period of three minutes for a catalyst bed of about five meters length, in a period of about five minutes for a catalyst bed length of about 10 meters, in a period of about 10 minutes for a catalyst bed length of about 20 meters.

11. Improvement according to claim 1 in which said liquid extracting agent is a carbon monoxide hydrogenation synthesis product containing more than 50% of compounds boiling between about 180 and 320° C.

12. Improvement according to claim 11 in which said liquid extracting agent is a carbon monoxide hydrogenation synthesis product from the synthesis containing more than 75% of compounds boiling between about 180–320° C.

13. Improvement according to claim 12 in which said liquid extracting agent contains more than 75% of compounds of compounds boiling between about 200 and 260° C.

14. Improvement according to claim 1 in which said liquid extracting agent is a liquid synthesis product from the synthesis itself being obtained as a partial stream from an intermediate separator tank filled with filling bodies the liquid synthesis product having been obtained by passing the synthesis product in gaseous form through the filling bodies in the said separator in an upward direction so that there is obtained a rectifying effect producing said liquid synthesis product.

15. Improvement according to claim 1 in which said liquid extracting agent is a synthesis product obtained from the synthesis itself including more than 50% of compounds boiling between about 180 and 320° C. and which includes partially neutralizing free acid content of this synthesis product with an alkaline reacting material prior to the use thereof in the said liquid extracting agent.

16. Improvement according to claim 15 in which the neutralization is effected to a neutralization number equivalent of about 3–20.

17. Improvement according to claim 16 in which said neutralization is effected to a neutralization number between about 5–15.

18. Improvement according to claim 1, in which said hydrogenation of carbon monoxide and said periodic extractions are effected at temperature of between 150° and 400° C.

19. Improvement according to claim 1, in which said hydrogenation of carbon monoxide and said periodic extractions are effected at temperatures of 200–300° C.

20. Improvement according to claim 1, in which the reactants consist of carbon monoxide and steam.

21. Improvement according to claim 1, in which the temperature in the synthesis reactor drops by not more than 25° C. when using cold extraction oil.

22. Improvement according to claim 1, in which said synthesis gases and said liquid extraction agent are introduced in cocurrent flow relation.

References Cited in the file of this patent

UNITED STATES PATENTS

| | | |
|---|---|---|
| 2,238,726 | Feisst et al. | Apr. 15, 1941 |
| 2,259,961 | Myddleton | Oct. 21, 1941 |
| 2,438,029 | Atwell | Mar. 16, 1948 |
| 2,579,663 | Gilbert et al. | Dec. 25, 1951 |
| 2,738,362 | Rottig | Mar. 13, 1956 |
| 2,775,607 | Kolbel et al. | Dec. 25, 1956 |